United States Patent [19]
Gall et al.

[11] Patent Number: 4,499,489
[45] Date of Patent: Feb. 12, 1985

[54] PRODUCTION OF SCREEN PRINTING BLOCKS

[75] Inventors: Winrich Gall, Klausdorf; Klaus Wellendorf, Kitzeberg bei Kiel, both of Fed. Rep. of Germany

[73] Assignee: Dr. Ing. Rudolf Hell GmbH, Fed. Rep. of Germany

[21] Appl. No.: 479,974

[22] Filed: Mar. 25, 1983

Related U.S. Application Data

[63] Continuation of Ser. No. 271,102, Jun. 8, 1981, abandoned, which is a continuation of Ser. No. 054,978, Jul. 5, 1979, abandoned.

[51] Int. Cl.$^3$ .............................................. H04N 1/46
[52] U.S. Cl. .......................................... 358/75; 358/78
[58] Field of Search ..................................... 358/75–80

[56] References Cited

U.S. PATENT DOCUMENTS

| | | | |
|---|---|---|---|
| 3,272,918 | 9/1966 | Koll et al. | 358/287 |
| 3,657,472 | 4/1972 | Taudt | 358/78 |
| 3,688,033 | 8/1972 | Hell | 178/15 |
| 3,725,574 | 4/1973 | Gast | 358/298 |
| 3,742,129 | 6/1973 | Roberts | 358/78 |
| 3,911,480 | 10/1975 | Brucker | 358/75 |
| 3,922,484 | 11/1975 | Keller | 358/256 |
| 3,997,911 | 12/1976 | Perriman et al. | 358/75 |
| 4,084,183 | 4/1978 | Keller | 358/75 |
| 4,149,195 | 4/1979 | Gast | 358/283 |
| 4,350,996 | 9/1982 | Rosenfeld | 358/75 |
| 4,456,924 | 6/1984 | Rosenfeld | 358/78 |

FOREIGN PATENT DOCUMENTS 2026283  1/1980  United Kingdom .

Primary Examiner—Michael A. Masinick

[57] ABSTRACT

A method for producing half-tone reproductions such as printing blocks or color separators of an original on a recording medium by means of a recording element using rotated screens having any screen angle and any screen line spacing and being formed of periodically repeated, adjacent screen grid elements comprising screen dots varying in size with the tone values of the original.

The recording medium has co-ordinated with it an UV co-ordinate system directed in the line direction and an XY co-ordinate system turned through the screen angle, both co-ordinate systems being subdivided into areal elements from which picture half-tone dots to be produced are collated. Notwithstanding the screen angle, screen threshold values are associated with areal elements of a matrix of limited scanning pattern range which corresponds to at least one screen grid element of the screen which is to be recorded. During the recording operation, the UV locus co-ordinates of the areal elements momentarily traversed by the recording element are recalculated in the form of the corresponding XY locus co-ordinates of the limited scanning range of the matrix and the screen threshold values associated with the XY locus co-ordinates determined are "called up" from the matrix. A control signal which determines whether the areal element in question is or is not recorded on the recording medium is generated for the recording element by a current comparison of the screen threshold values called up with an image signal obtained by scanning the original.

50 Claims, 9 Drawing Figures

PRODUCTION OF SCREEN PRINTING BLOCKS

This is a continuation of application Ser. No. 271,102 filed June 8, 1981, now abandoned. Application Ser. No. 271,102 was a continuation of U.S. Ser. No. 054,978 filed July 5, 1979, also now abandoned. Thus, the present application has the benefit of the first case Ser. No. 054,978 filed July 5, 1979.

BACKGROUND OF THE INVENTION

The present invention relates to a method for producing half-tone reproductions (preferably printing blocks or color separations) of an original on a recording medium by means of a recording element using rotated screens having any screen angle and any screen line spacing and being formed of periodically repeated, adjacent screen grid elements comprising screen dots varying in size with the tone values of the original. The original is optoelectronically scanned line-wise and pixel-by-pixel, dot-by-dot, or point-by-point for producing an image signal and by line-wise recording by means of a recording element displaced over and with respect to a recording medium, the latter having associated with it an orthogonal co-ordinate system subdivided into areal elements and aligned in the line direction. The locus co-ordinates of the areal elements traversed momentarily by the recording element are determined continuously and a recording signal is generated for the recording element by current comparison of the image signal with a screen threshold signal, the recording signal controlling the recording of the individul screen dots as a configuration of areal elements in the co-ordinate system. The invention also relates to a system for carrying out the method.

The inventive method is applicable for example in the case of a color scanner for producing corrected color separations. In the case of a color scanner of this nature, which is known per se, a colored original is scanned point by point and line by line by means of an optoelectronic scanning element and three primary color signals are concomitantly obtained which are converted in a color computer into the color-corrected color separation signals for recording the colour components "magenta", "cyan" and "yellow".

Recording elements in the form of light sources modulated in brightness by the color separation signals, peform the point-by-point and line-by-line exposure of the color components on a photosensitive recording medium. The color separations may be produced as half-tone color separations for further processing in engraving machines or else as screen color printing blocks if they are to be applied as forms for color offset printing.

The printing in superimposition of the differently inked screen printing blocks of a colour separation for multicolor reproduction is then performed in a printing machine.

A moiré pattern is generated since it is impossible in practice to print the screen dots of the individual component colors precisely on each other. A moiré pattern of this nature is disturbing particularly upon inspecting the finished printed picture.

The obtrusiveness of moiré effects is reduced in known manner, by the fact that the screen grids of the individual color separations of a color set are printed in superimposition in angularly staggered position with respect to each other. By virtue of the screen angle, the moiré phases formed are in effect either too small or too large to be noticed as troublesome by the human eye. Color separations wherein the individual screen grids are turned through different screen angles with respect to the recording direction, are required for a screen rotation of this kind.

Consequently, four different screen angles are needed for the four color separations. To produce a moiré minimum, it proved to be advantageous in four-color printing to select the screen angle $-15°$ for "magenta", the screen angle $+15°$ for "cyan", the screen angle $0°$ for "yellow" and the screen angle $+45°$ for "black". The screen angles should be adhered to very precisely since troublesome moiré effects already intervene at small angular deflections.

Other screen angles are then required in complementary fashion if other colors are to be printed, other print mediums are to be applied or if different screen line spacings are to be printed one over another.

The direct application of a screen on originals in the color scanner may for example be performed by means of a so-called contact screen application, wherein the recording beam is modulated in complementary fashion by the density variation of a contact screen film positioned between the recording element and the recording facility, to generate the screen grid elements.

For example U.S. Pat. No. 3,688,033 disclosed a method for so-called "electronic screen application" wherein each screen grid element is built up in the manner of a picture pattern from individual picture elements or type or body lines. The picture patterns of the different screen grid element sizes are stored as recording data for all tonal values and for different screen angles. The recording data are currently read out and recorded in each case, which correspond to the tonal values determined during scanning of the original, during the reproducing operation.

Whereas the instrument-related composition screen grid in which the screen grid elements are recorded is aligned orthogonally in the recording direction and feed direction of the implement, printing screen grids rotated in various angles with respect to the composition screen grid are decisive for the precise positional location of the screen grid elements on the recording medium.

What is required is to fit the different printing screen grids into the system of the printing lines. This is particularly uncomplicated according to U.S. Pat. No. 3,657,472 if the tangent of the screen angle is a simple rational number. A common areal element which has the fundamental structure of the screen pattern and which is repeated periodically on the recording medium in the recording and feed direction, whereby the recording operation is controllable by means of uncomplicated cadencing systems which are coupled to the displacement of the recording medium or with the feed motion of the recording element, then results for both screen systems in the case of such "rational screens".

Screen grids having screen angles whereof the tangent is irrational, cannot be recorded according to the method hereinabove described, so that the screen angles of plus and minus 15° required for a moiré minimum cannot be established either.

A different method, whereby "irrational screens" may also be recorded, is described in the U.S. Pat. No. 3,997,911. In this known method, XY pulse series are derived from the displacement of the recording drum and from the feed motion of the recording element, the analysis of said series determining the momentary positional locus of the recording element with respect to the recording facility in an orthogonal co-ordinate system aligned in the recording and feed direction.

The XY pulse series are converted in accordance with a predetermined function, to generate a screen signal. This function, which is periodic and bi-dimensional, represents the screen pattern turned through the required screen angle.

During the recording action, the screen signal and the image signal are compared continuously and the decision as to whether a screen grid element is to be or is not to be recorded at the locus characterised by XY pulse series is derived from the comparison.

The function is reproduced electrically in a function generator wherein, among others, other pulse series are initially generated by multiplication of the frequencies of the XY pulse series by particular factors, the factors being irrational or almost irrational and representing different functions of the screen angle selected for the printing operation.

The multiplication is performed by means of phase-locked loop circuits which, according to experience, have a build-up action and relatively low stability. The required screen angle may consequently be adhered to with a limited precision only, so that as already stated, troublesome moiré phenomena may appear at a particular angular deviation.

To improve the definition and printability of the screen dots, it is frequently desirable to produce different screen dot shapes or to split the screen dot into partial elements, in accordance with U.S. Pat. No. 3,997,911 hereinabove referred to.

In the method disclosed by the U.S. Pat. No. 3,997,911, it may well be possible to produce circular or rectangular screen dots by means of different functions, but the possibilities of variation are very limited. Furthermore, some of the functions specified may be reproduced in a function generator with difficulty only, which is considered to be disadvantageous.

In the known device, the recording is produced by several partial beams situated one beside another, which are emitted from a recording element. The image signal must be compared to different screen signals, to control the partial beams. The generation of the screen signals which must make allowance for the different points of impingement of the partial beams on the recording facility, is not described in particular.

SUMMARY OF THE INVENTION

Accordingly, in a method of the kind hereinabove specified, with the invention an orthogonal X-Y co-ordinate system which includes the screen angle β relative to the U-V co-ordinate system aligned in the line direction, and which is aligned in the direction of the screen, is associated with the turned screen which is to be recorded. This screen comprises orthogonal screen grid elements corresponding in size to the predetermined screen line spacing, and each screen grid element is comprised of the areal elements with which are associated corresponding x;y locus co-ordinates. Notwithstanding the screen angle β, a screen threshold value is associated in each case with the areal elements of at least one fictional screen grid element of optional screen line spacing as a function of their x;y locus co-ordinates. The u;v locus co-ordinates of said areal elements allocated during current co-ordinate determination to a screen grid element which is to be recorded and has a predetermined screen line spacing, are recalculated into the limited range of values of the corresponding x;y co-ordinates of said fictional screen grid element. The screen threshold value associated with each pair of co-ordinates which upon comparison with the corresponding image signal determines whether the areal element in question is or is not recorded as a part of a screen dot in the U-V co-ordinate system, is determined by means of said recalculated or converted x;y locus co-ordinates.

This method avoids or minimizes the disadvantages referred to.

One advantage of the method specified is that any optional screen angle, i.e. a screen angle whose tangent is rational or irrational, may be set up with high precision. It is thus possible to record "rational screens" and "irrational screens". The screen angles of plus or minus 15° may preferentially also be set up, as required for a moiré minimum. The screen line spacing is concomitantly unaffected by the screen angle selected.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF PREFERRED EMBODIMENTS

Figure 1:
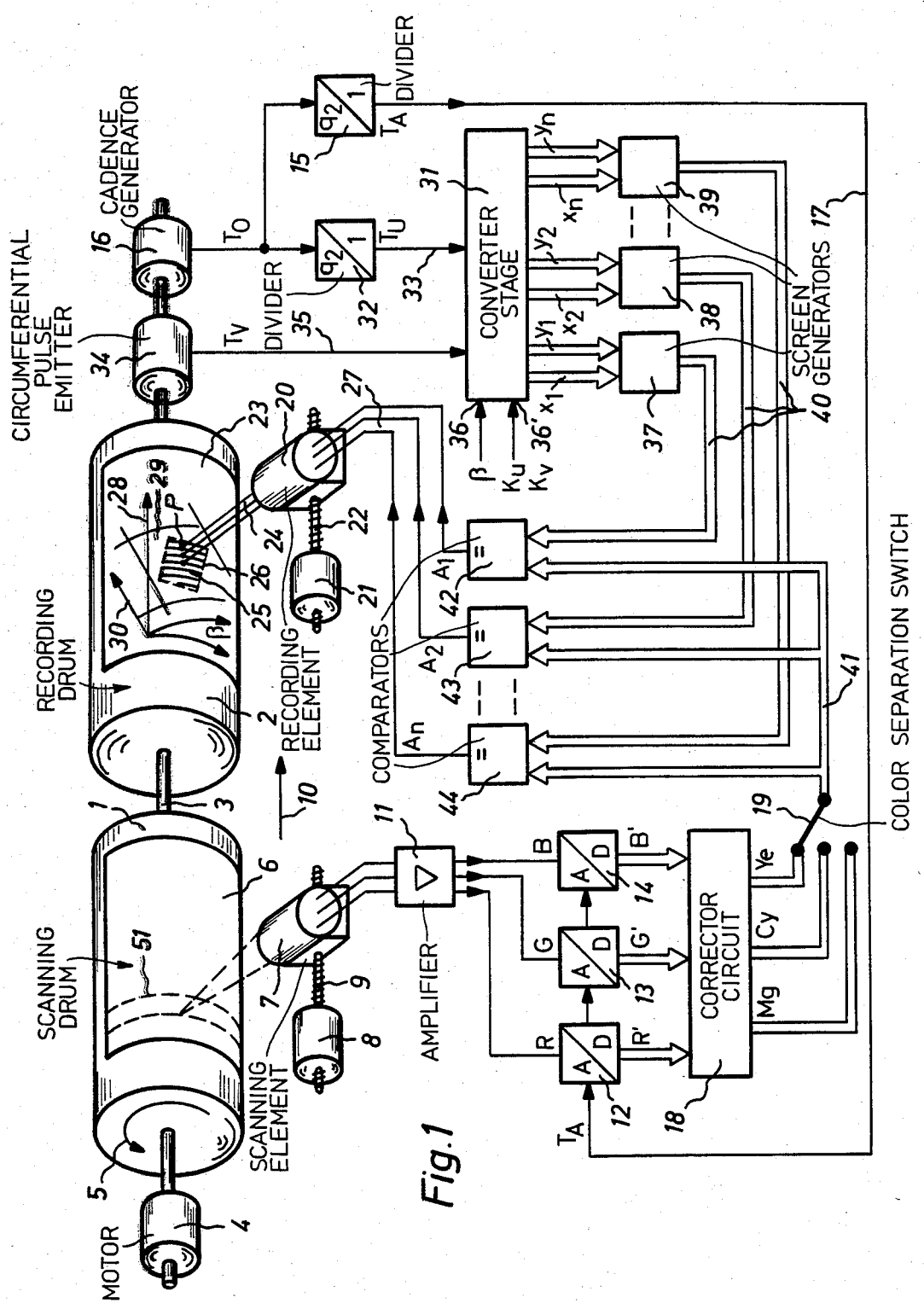
FIG. 1 shows a fundamental block diagram of a color scanner.

Referring now to the drawings, FIG. 1 shows a fundamental block diagram of a color scanner for the production of electronically screened and correct color separations.

A scanning drum 1 and a recording drum 2 are coupled via a spindle 3 and are driven jointly by a motor 4 in the direction of an arrow 5.

A color original 6 is clipped on the scanning drum 1 and is scanned by a point of light of a light source not shown in particular, point-by-point or dot-by-dot and line-by-line. In the case of an opaque original it is the reflected scanning beam, and in the case of a transparent original it is the transmitted scanning beam, which reaches a scanning element n, being modulated in brightness by the pictorial content of the original 6. The color signals R,G and B which represent the color components of the image dots scanned, are generated in the scanning element 7 by color separation by means of color filters and through optoelectronic conversion of the scanning beam.

The scanning element 7 is displaced parallel to the scanning drum 1 in the direction of an arrow 10, by means of a motor 8 and a spindle 9.

The color analogue signals, R, G, B pass from the scanning element 7 and via a post-connected amplifier 11 to A/D converters 12, 13, 14 in which they are converted by means of a cyclic scanning sequence $T_A$ into digital color signals R', G' and B' having a word length of 8 bits for example, a scanned picture dot being co-ordinated with each cycle of the cyclic scanning sequence $T_A$.

The cyclic scanning sequence $T_A$ is generated by frequency division in a divider stage 15 from a cyclic sequence $T_O$, which is generated by means of a cadence generator 16 coupled in rotation to the drums. The cyclic scanning sequence is fed to the A/D converters 12, 13 and 14 via a conductor 17.

The digital color signals R', G' and B' are converted in a digital corrector circuit 18 into the corrected color separation signals Mg, Cy, Ye for recording the color separations "magenta", "cyan" and "yellow".

A color and/or gradation correction is performed in the digital corrector circuit 18, depending on the requirements of the reproduction process. A corrector circuit of this nature is described exhaustively, for example, in the U.S. Pat. No. 3,885,244.

A digital memory for intermediate storage of the color separation signals may also be post-connected to the corrector circuit 18, to perform a scalar change between the original and the recording in accordance with U.S. Pat. No. 3,272,918, or to record the pictorial content of the entire original and to recall or repeat the same for recording with a time lag or if appropriate at a specific locus.

In the embodiment, the digital color separation signals Mg, Cy, Ye, reach a color separation switch 19 whereby one of the digital color separation signals is selected in each case for screened recording of a separation.

The invention is obviously also applicable if all the separations are recorded in one operation, beside each other in parallel or serially, on the circumference of the recording drum 2.

A recording element 20 is displaced by means of another motor 21 and of a spindle 22, axially along the revolving recording drum 2 in the direction of the arrow 10. The recording element 20 performs the point-by-point or dot by dot and line-by-line illumination of the screen dots on a photosensitive recording medium 23 which is arranged on the recording drum 2.

The recording beams 24 focussed on the recording medium 23 by the recording element 20 produce a number of exposure points $P_n$ which by virtue of the relative displacement between the recording element 20 and the recording drum 2 also illuminate the recording medium 23 along type lines 25 extending in the circumferential direction (recording direction).

Figure 5:
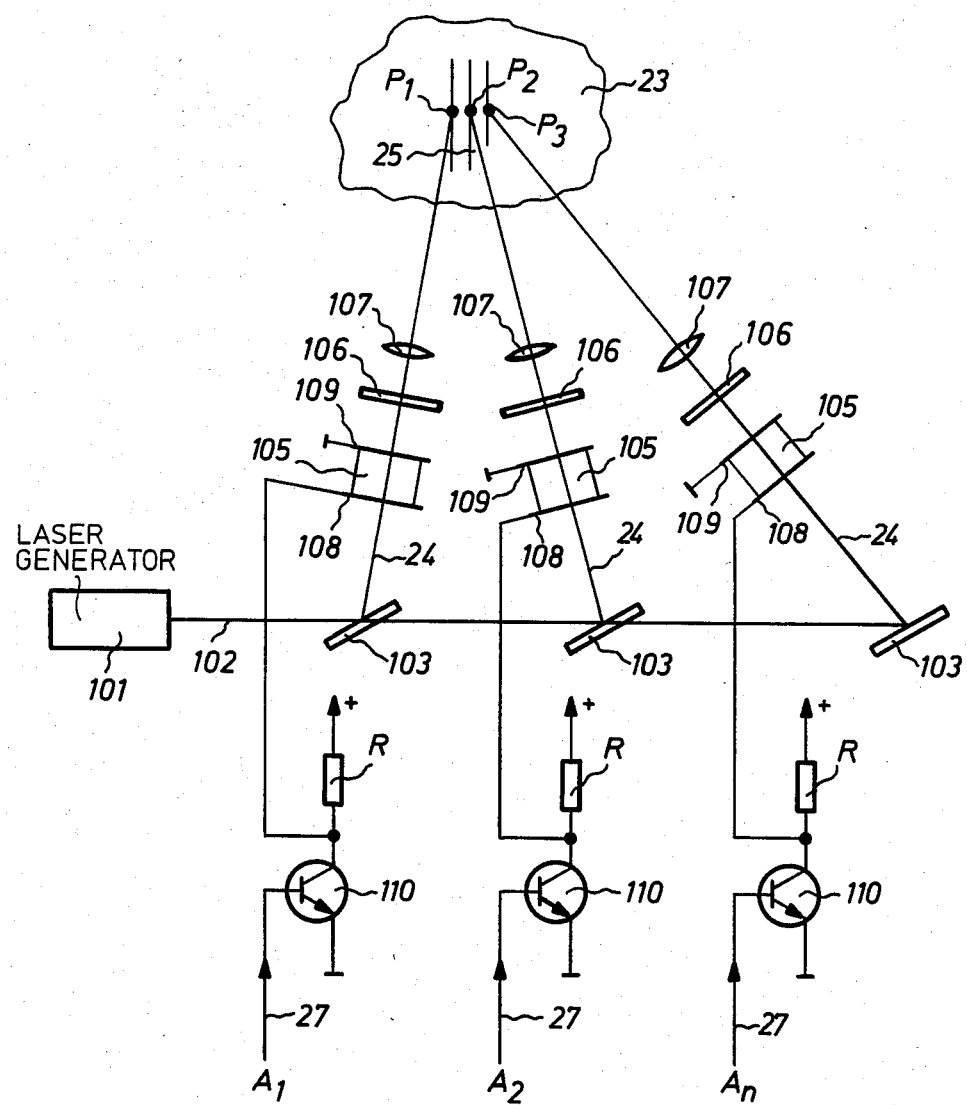
FIG. 5 shows an embodiment of a recording element.

Each screen dot 26 comprises a number of such closely set type lines 25. The size and shape of a screen dot depends on the length of the type or body lines 25 or rather on the momentary period of energization of the individual recording beams 24. The recording beams 24 may be switched on and off by recording signals $A_n$ which are fed to the recording element 20 via conductors 27. One embodiment of recording element 20 is illustrated in FIG. 5.

It is within the scope of the invention to illuminate the type lines 25 of the screen dot 26 by means of a single recording beam 24 deflectible transversely to the recording direction.

In this case, the screen dot 26 comprises type lines extending transversely to the recording direction. The deflection of the recording beam 24 may be produced by means of an electro-acoustic deflector system, e.g. as specified in the U.S. Pat. No. 3,725,574.

The process stages for obtaining the recording signals $A_n$ are to be described in particular in the following.

The momentary positional locus of the exposure points $P_n$ on the recording medium 23 is established on the recording drum 2 by means of an instrument-related U-V co-ordinate system 28 unaffected by the screen angle $\beta$ beta, whose U axis is aligned in the peripheral direction of the recording drum 2 and whose V axis is aligned in the feed direction of the scanning and recording elements. The U-V co-ordinate system 28 is subdivided into a plurality of areal elements from which the screen dots which are to be recorded are built up.

The positional locus of the screen dots 26 on the recording medium 23 is given by a screen grid 29 in an X-Y co-ordinate system 30 which is turned through the screen angle $\beta$ with respect to the U-V co-ordinate system 28.

The screen grid 29 comprises a plurality of screen grid elements whose size depends on the screen line spacing which is to be recorded. Each screen grid element is built up from the areal elements which are associated with corresponding x';y' locus co-ordinates.

A spatial function $R = g(x;y)$ having a range of values limited to the fictional screen grid element, which defines the size of the screen dots as a function of different image signal amplitudes (tonal value stages) and the screen dot shape, is preset for a fictional screen grid element which is unaffected by the screen angle and the screen line spacing of the screen which is to be recorded. As explained later, this function is stored in a matrix. In this function, R is the screen threshold value of an areal element, and x;y are its associated locus co-ordinates in the X-Y co-ordinate system 30.

The range of values of the x-y locus co-ordinates corresponding to the preset function is restricted as compared to the range of values of the x';y' locus co-ordinates of the exposure points $P_n$ determined upon traversal of the entire recording area.

The spatial representation of the function $R = g(x;y)$ is also referred to as a "screen hill" whose base surface fills the fictional screen grid element and wherein a cross-sectional surface passing through the screen hill at the level of the momentary image signal amplitude indicates the screen dot size for the tonal value in question.

In the course of reproduction, the current x';y' locus co-ordinates of the exposure points in the X-Y co-ordinate system 30 are determined, converted to the limited range of values of the x;y locus co-ordinates of the spurious screen grid element, and the screen threshold value co-ordinated by means of the function is called up or invoked. The screen threshold value is compared to the image signal and the decision whether the areal element in question in the U-V co-ordinate system 28 is or is not to be recorded as part of a screen dot, is derived from the comparison.

The U and the V axes are divided into fundamental steps $\Delta u$ and $\Delta v$, to determine the locus co-ordinates $u_n;v_n$ of the exposure points $P_n$ in the U-V co-ordinate system 28. The length of the fundamental steps may differ between the axes.

The locus co-ordinates $u_n;v_n$ amount to a multiple of the fundamental steps $\Delta u$ and $\Delta v$.

In a first process stage, the momentary locus co-ordinates $u_n;v_n$ of the exposure points $P_n$ are determined by current counting or summation addition of the fundamental steps $\Delta u$ and $\Delta v$ by means of two timing sequences $T_u$ and $T_v$ in a converter stage 31. The timing sequence $T_u$ is obtained by frequency division in a divider stage 32 from the timing sequence $T_o$ of the cadence generator 16 and is fed to the converter stage 31 via a conductor 33. A fundamental step $\Delta u$ is co-ordinated with each cycle of the timing sequence $T_u$. The length of the fundamental step may be changed by the frequency of the timing sequence $T_u$ and may if appropriate be adapted to the required precision.

A circumferential pulse emitter 34 which is equally coupled to the recording drum 2, generates a circumferential pulse $T_v$ co-ordinated in each instance with a fundamental step $\Delta v$, once per revolution, i.e. after every feed step of the scanning element 7 and of the recording element 20. The circumferential pulses $T_v$ are fed to the converter stage 31 via a conductor 35.

The locus co-ordinates $u_1;v_1$ for the first point of exposure $P_1$ are derived from the equation:

$$u_1 = C_u \cdot \Delta u$$
$$v_1 = C_v \cdot \Delta v \qquad (1)$$

$\Delta u$ and $\Delta v$ denoting the fundamental steps in the U-V co-ordinate system 28 and $C_u$ and $C_v$ denoting the number of timing pulses $T_u$ and $T_v$ respectively.

The pairs of locus co-ordinates for the other exposure points may advantageously be calculated from the pair of locus co-ordinates of one of the exposure points, e.g. of the first exposure point $P_l$. The position of the exposure points $P_n$ with respect to each other may be optional, but the exposure points will commonly lie on a straight line.

To establish a homogenous density curve over the screen dot surface, the straight line corresponding to German Patent Application No. P 26 53 539.7 extends at an angle to the generatrix of the recording drum 2.

In this case, the mutual spacings $u^*$ and $v^*$ of the exposure points are constant and depend only on the structural design of the recording element 20 and on the scale of reproduction. The locus co-ordinates $u_n;v_n$ of the other exposure points $P_n$ may consequently be calculated in accordance wih the equation $u_n = u_1 + (n-1)u^*$ and $v_n = v_1 + (n-1)v^*$.

The exposure points are frequently situated on the actual generatrix of the recording drum 2, however when $u^* = 0$.

Since the function $R = (x;y)$ is preset notwithstanding the screen angle $\beta$, and the screen line spacing, the locus co-ordinates $u_n;v_n$ of the U-V co-ordinate system are currently converted into the corresponding locus co-ordinates $x'_n; y'_n$ of the X-Y co-ordinate system 30 in a second process stage, in the converter stage 31, with allowance for the screen angle $\beta$ and for the different screen line spacings of the screen grid element which is to be recorded and of the spurious screen line element.

During the conversion, the greater range of values of the locus co-ordinates $x'_n;y'_n$ arising under illumination of the entire surface of the recording medium 23, is simultaneously restricted to the limited range of values of the x;y locus co-ordinates of the preset function $R = g(x;y)$. This operation will be described in particular in the following.

The conversion of the locus co-ordinates in the converter stage 31 is performed in accordance with the equations:

$$x_n = K_u \cdot u_n \cdot \cos \beta + K_v \cdot v_n \cdot \sin \beta - M_x$$
$$y_n = K_u \cdot u_n \cdot \sin \beta + K_v \cdot v_n \cdot \cos \beta - M_y \qquad (2)$$

In the equations (2), the coefficients $K_u$ and $K_v$ (scaling factors) make allowance for the different screen line spacings of the screen grid element which is to be recorded and of the fictional screen grid element, and the terms $M_x$ and $M_y$ take into account the limitation of the current $x';y'$ locus co-ordinates to the value range of the function.

The screen angle and the coefficients are preset at the programming input terminals 36 and 36' of the converter stage 31.

Figure 3:
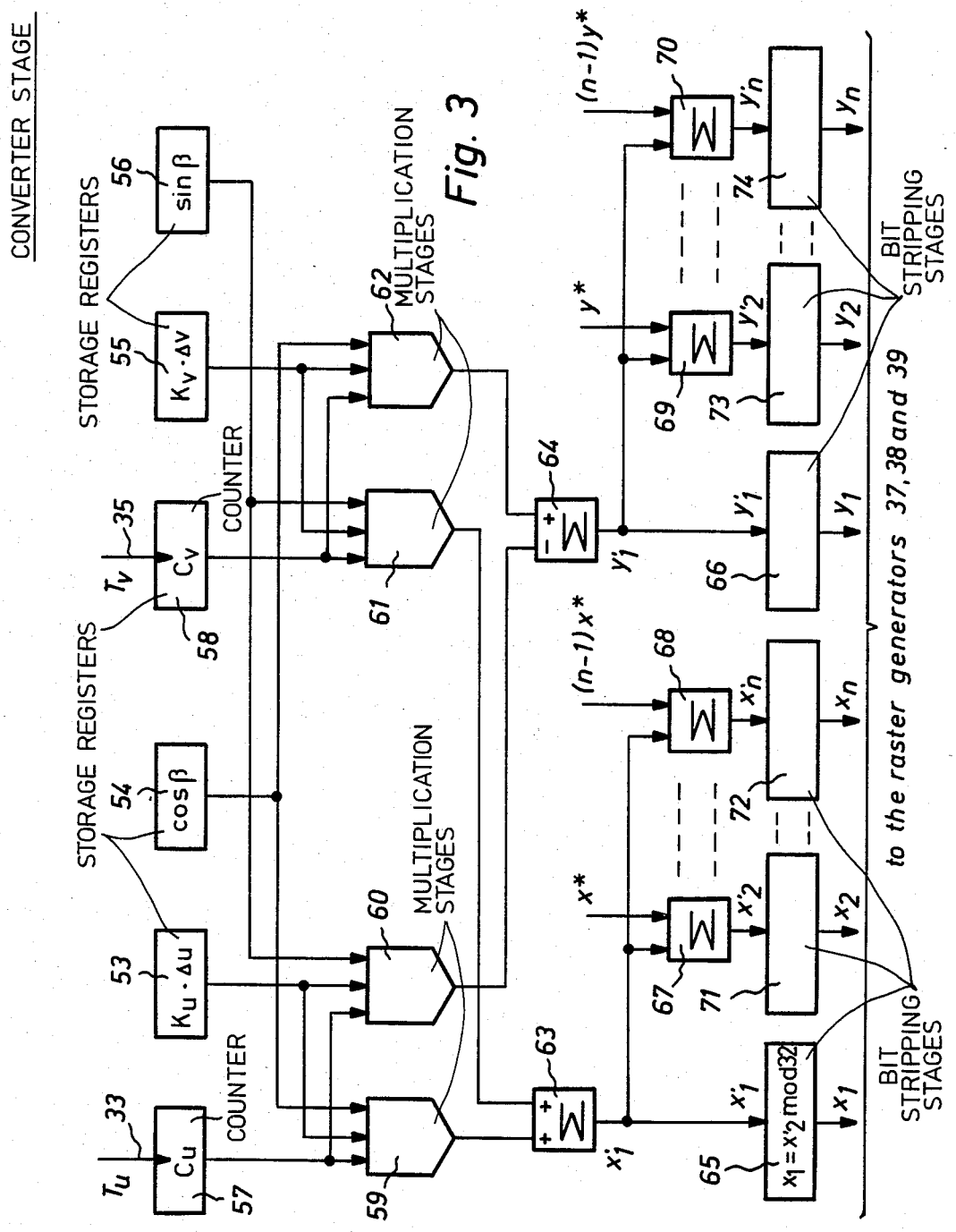
FIG. 3 shows an embodiment of converter stage.
Figure 4:
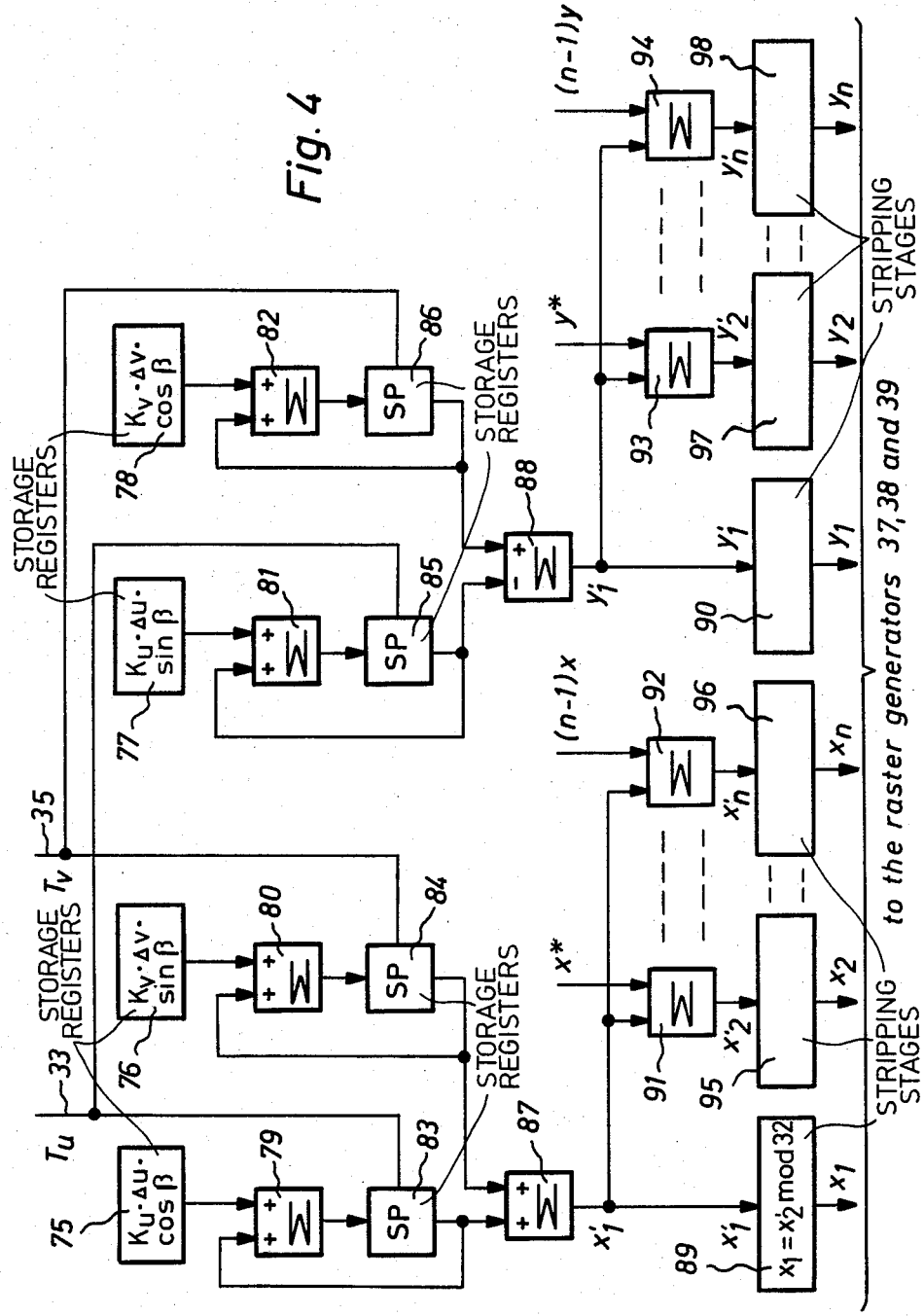
FIG. 4 shows another embodiment of converter stage.

Examples of embodiments of converter stage 31 are depicted in FIGS. 3 and 4.

At its output terminals, the converter stage 31 determines corresponding pairs of co-ordinates $x_n;y_n$ for each exposure point $P_n$. From the pairs of co-ordinates $x_n;y_n$, and in accordance with the preset function $R = g(x;y)$, the screen generators 37, 38 and 39 generate corresponding digital screen threshold values (screen values) $R_n$ which, like the digital color signals, equally have a word length of 8 bits.

Digital comparators 42, 43 and 44 are incorporated for comparing the screen threshold values $R_n$ on the conductors 40 to the color separation signal selected on the color separation switch 19 on a conductor 41.

These comparators 42, 43 and 44 generate the recording signals $A_n$ on the conductors 27, with which the illumination of the screen dots 26 on the recording medium 23 is controlled.

A variety of advantageous possibilities is available for the structure of the screen generators 37; 38;39.

In the embodiment, the screen generators comprise read-only storage units, in which the same function $R = g(x;y)$ is stored in each case.

The read-only storage unit comprises a storage matrix representing the fictional screen grid element, e.g. incorporating 32×32 storage cells for the screen threshold values (in the general case a×b storage cells). The storage cells are selectible by means of 32 x addresses (5 bit) and of 32 y addresses. In this case, the x;y value range for the function is limited to "32", i.e. to the addresses 0 to 31 in each case.

It may also be envisaged to address all the read-only memories with the x;y co-ordinate values of one of the exposure points and to obtain the different screen threshold values B for the other exposure points by making allowance for the appropriate mutual spacings $u^*$ and $v^*$ of the other exposure points converted into the X-Y co-ordinate system 30, when programming the individual read-only memories.

To save on read-only memories, the different pairs of x;y locus co-ordinates for the exposure points may address a single read-only memory consecutively by the time-sharing method.

The screen generators 37, 38 and 39 may equally comprise function generators which reproduce the function $R = g(x;y)$.

In this case, the function could preferentially assume the form $R = g(D \cdot x + E \cdot y)$.

In the case in which the function generator operates digitally, the function $R = g(x;y)$ could be stored in a memory whose address input terminals have applied to them the sum (D·x+E·y). Identically, the products (D·x) and (E·y) may be stored in one or more memories, which may then be addressed directly with the x;y co-ordinate values.

In the arrangement according to FIG. 1, the feed displacement of the scanning element 7 and recording element 20 in the direction of the arrow 10, may be intermittent or continuous.

In the case of an intermittent feed, the scanning and recording actions occur around the drums along circular image lines whose mutual spacing corresponds to a feed step. By contrast, in case of a continuous feed, the scanning and recording actions occur along image lines extending helically around the drums. In this case, small errors arise during the recording operation, which in accordance with an advantageous development of the invention principle may be cancelled in the conversion equations (2) by correction factors $(S_v \cdot \sin \beta)$ and $(S_v \cdot \cos \beta)$, "$S_v$" denoting the pitch of the helix and "$\beta$" again denoting the screen angle. The conversion equations then have the following form:

$$x = K_u \cdot u \cdot (\cos \beta + S_v \cdot \sin \beta) + K_v \cdot v \cdot \sin \beta - M_x$$
$$y = K_u \cdot u \cdot (-\sin \beta + S_v \cdot \cos \beta) + K_v \cdot v \cdot \cos \beta - M_y \quad (3)$$

Figure 2:
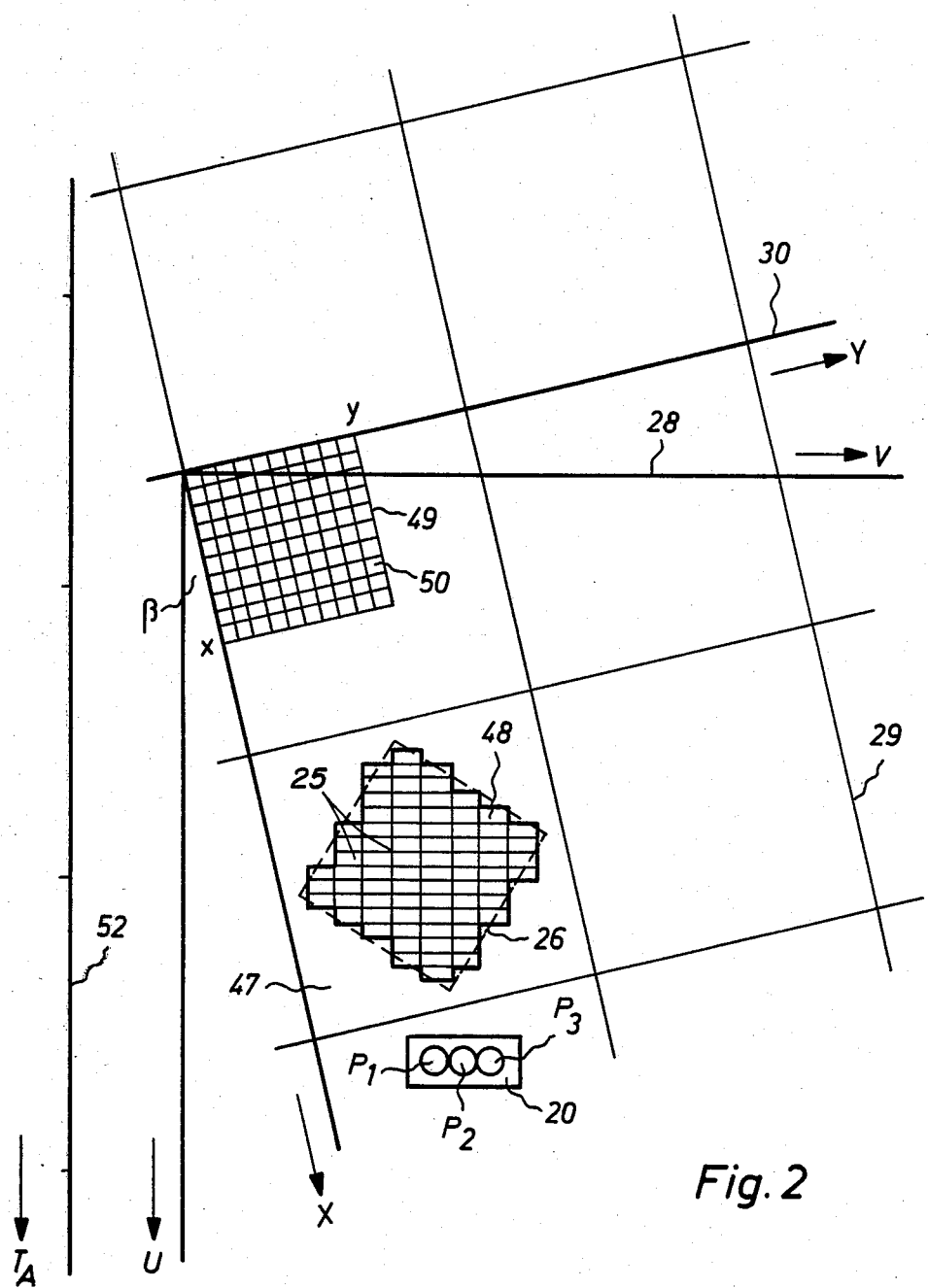
FIG. 2 shows an enlarged section of the recording medium.

For a clearer grasp of the screen grid element recording, FIG. 2 shows an enlarged section of the recording medium 23 with the instrument-related U-V co-ordinate system 28 (U direction = recording direction) and with turned screen grid 29 which is to be recorded and with respect to this the X-Y co-ordinate system 30 is aligned, the co-ordinate systems including the screen angle $\beta$.

The screen grid element 47 of the rotated screen grid 29, comprising the screen dot 26, to a degree represents the fundamental structure of the screen pattern which is continued periodically in the X and Y directions throughout the recording surface.

The screen dot 26 comprises a number of mutually adjacent type lines 25 extending in the recording direction. Each type line 25 is built up from individual areal elements 48 which are associated with current u;v and x';y' locus co-ordinates.

A fictional or spurious screen grid element 49 of optional screen line spacing which equally comprises a number of areal elements 50, is also shown. Each areal element 50 is associated with a screen threshold value R and with a pair of x;y locus co-ordinates, whose range of values is restricted however to the fictional or spurious screen grid element 49.

For each areal element 48 which is momentarily traversed by an exposure point a screen threshold value corresponding to a congruent areal element 50 in the fictional or spurious screen grid element 49 is determined in accordance with the equations (2) specified in FIG. 1, and this threshold value is compared to the image signal to obtain the recording signals, during the recording operation.

Different possibilities arise for obtaining the image signal.

In the embodiment according to FIG. 1, the recording element 20 which is merely hinted at in FIG. 2, generates for example three recording beams 24 and thereby also several mutually adjacent exposure points $P_n$ which simultaneously illuminate a corresponding number of type lines 25 during one revolution of the recording drum 2.

If three exposure points $P_1$ to $P_3$ are present, as shown in FIG. 2, and if the screen dot 26 comprises six type lines 25 (or linear tracings), the screen dot 26 has been exposed by the scanning element 7 and recording element 20 after two drum revolutions or rather feed steps. In this case, no more than two image data of the original 6 scanned on two mutually adjacent image lines 51 are available for all the linear type lines 25 of the screen dot 26. The precision of the recording may be increased if an image datum obtained from a positionally co-ordinated image line 51 is available for each type line 25.

This may be accomplished in advantageous manner, in accordance with the U.S. Pat. No. 4,149,195, by the fact that a plurality of image dots which are mutually adjacent in the V direction of the UV co-ordinate system 28 are scanned simultaneously in the original 6 and that it is the image signal of the image dot whose positional locus on the original 6 corresponds to the linear tracing or type line 25 which is just to be recorded is in each case selected for controlling the recording element.

The recording element 20 may however generate no more than one recording beam 24 and thus at the same time no more than one exposure point $P_1$ on the recording facility 23. In this case, one linear tracing or type line 25 is illuminated in each case per revolution of the recording drum 2, the scanning element 7 and the recording element 20 performing one feed step by a linear tracing width after each revolution. An image datum is thereby obtained from an image line 51 of the original 6 which is positionally co-ordinated in the V direction, for each linear tracing 25 of the screen dot 26. This method may well be very precise, but it operates very slowly.

It is obviously also possible to scan several image dots in circumferential direction for each screen dot 26.

FIG. 3 shows an embodiment of the converter stage 31 wherein the current u;v locus co-ordinates of the U-V co-ordinate system 28 are determined by counting the fundamental steps $\Delta u$ and $\Delta v$ and are converted in accordance with equation (2) into the co-ordinates $x_n;y_n$ for driving the screen generators 37, 38 and 39.

The values $K_u \cdot \Delta u$ and $K_v \cdot \Delta v$, as well as $\cos \beta$ and $\sin \beta$, are stored in storage registers 53 to 56.

The cycles $T_u$ and $T_v$ on the conductors 33 and 35 are counted in the counters 57 and 58. The counter levels correspond to the factors $C_u$ and $C_v$. The factors are multiplied in the multiplication stages 59–62, in accordance with equations (2), and the products are then summated in the adding stages 63 and 64. The current locus co-ordinates $x'_1;y'_1$ for the first exposure point $P_1$ are the result in the form of a 32-bit datum.

Since the 32 x addresses and 32 y addresses of the read-only memory are selectible in the screen generators 37, 38 and 39 by means of 5-bit data in each case, the calculated locus co-ordinates $x'_1;y'_1$ (32-bit) are converted to the limited $x_1;y_1$ address range from 0-31 (5-bit) according to the relationship $x_1 = x'_1$ mod. 32 or resp. $y_1 = y'_1$ mod.32 (in the general case $x_1 = x'_1$ mod a and $y_1 = y'_1$ mod b for "a" addresses and "b" y addresses), in the stages 65 and 66. The conversion occurs by stripping or skimming off the bits of higher significance.

The output signals $x_1$ and $y_1$ of the stages 65 and 66 are the pair of addresses for the exposure point $P_1$ for selection of the read-only memory 37.

The other pairs of addresses $x_n;y_n$ for the other exposure points $P_n$ are determined by adding the values $(n-1)x^*$ and $(n-1)y^*$ to the calculated locus co-ordinates $x'_1$ and $y'_1$ in the adding stages 67–70, and by stripping off bits in the stages 71–74. The values x* and y* are calculated from the predetermined spacings u* and v* of the exposure points $P_n$.

The pairs of addresses $x_n;y_n$ for the other exposure points $P_n$ may also be determined by adding the values (n−1)u* and (n−1)v* to the locus co-ordinates $u_1$ and $v_1$ of the first exposure point $P_1$ and by subsequent conversion.

FIG. 4 shows another example of embodiment of a converter stage 31 wherein the locus co-ordinates $u_n;v_n$ of the exposure points $P_n$ are determined by summating addition of the fundamental steps u and v.

The u:v locus co-ordinates are determined in fundamental steps ($\Delta$u; $\Delta$v), and the corresponding x;y locus co-ordinates are calculated by continuing summating addition of constant amounts $D_x = K_u \cdot \Delta u \cdot \cos \beta + K_v \cdot \Delta v \cdot \sin \beta$ (or respectively $D_y = -K_u \cdot \Delta u \cdot \sin \beta + K_v \cdot \Delta v \cdot \cos \beta$) to the previously determined locus co-ordinates in accordance with the relationship $x'_{(n+1)} = x'_n + D_x$ (or respectively $y'_{(n+1)} = y'_n + D_y$) where $x'_n$ and $y'_n$ are coordinates and $x'_{(n+1)}$ and $y'_{(n+1)}$ are the next following coordinates.

The values $K_u \cdot \Delta u \cdot \cos \beta$, $K_u \cdot \Delta u \cdot \sin \beta$, $K_v \cdot \Delta v \cdot \sin \beta$ and $K_v \cdot \Delta v \cdot \cos \beta$ of equation (2) are stored in the storage registers 75–78.

For summating addition of these values, the storage registers 75–78 are in each case connected to the first input terminals of adding stages 79–82. The adding stages 79–82 have post-connected to them other storage registers 83–86 whereof the output terminals are in each case connected by return lines to the second input terminals of the associated adding stages 79–82. The acceptance of the addition results in the storage registers 83–86 is controlled by the timing sequences $T_u$ and $T_v$ on the conductors 33 and 35.

The mode of operation of the adding stage 79 in combination with the storage register 83, is the following. Assuming the contents of the storage register 83 to be nil, the addendum at the secondary input terminal of the adding stage 79 is then also nil. The value $K_u \cdot \Delta u \cos \beta$ is consequently picked up in the storage register 83 with the first cycle of the timing sequence $T_u$ on the conductor 33. This value is fed back to the secondary input terminal of the adding stage 79 and added on thereat, so that the value $2K_u \cdot \Delta u \cdot \cos \beta$ is taken into the storage register 83 with the second cycle of the timing sequence $T_u$.

The contents of the storage registers 83 and 84 are added together in an adding stage 87, and those of the storage registers 85 and 86 in another adding stage 88. The results are the locus co-ordinates $x'_1$ and $y'_1$ for the first exposure point $P_1$, which are converted into the pair of locus co-ordinates $x_1;y_1$ by stripping in the stages 89 and 90.

As already described in respect of FIG. 3, determining the pairs of locus co-ordinates $x_n;y_n$ for the other exposure points $P_n$ is performed by means of the adding stages 91–94 and by means of the stages 95–98.

Determining the pairs of locus co-ordinates for the other exposure points $P_n$ may also be performed from the known values u* and v* or else by appropriate presetting of the storage registers 83–86.

FIG. 5 shows an embodiment of recording element 20.

A laser generator 101 generates a polarized light beam 102 which consecutively passes through three partially transparent mirrors 103. The recording beams 24 are deflected by reflection out of the beam 102 and are directed at the recording medium 23 by adjustment of the mirrors 103. A polarized rotation crystal 105, a polarizing filter 106 and an objective 107 are in each case situated in the beam path of the recording beams 24. When the crystals 105 are not energized, the polarization planes of the polarizing filters 106 are turned through precisely 90° with respect to the polarizing plane of the recording beam 24, so that the latter is neutralized.

An electrical field is generated in a polarization rotation crystal 105 by means of a control voltage between the control electrode 108 and the counterelectrode 109, which is at earth potential. The electrical field turns the polarization plane of the recording beam 24, in such manner that the same no longer impinges on the subsequent polarizing filter under the blocking angle, so that the recording beam 24 is activated.

The crystals 105 are thus utilized as light switches which are activated and deactivated by the digital recording signals $A_n$ on the conductors 27. The recording signals $A_n$ are converted via amplifiers 110 into the control voltages for the crystals 105.

Instead of the system of mirrors, a separate laser generator 101 could also be present for each recording beam 24. The recording beam 24 emerging from the polarizing filters 106 could also be focussed on the recording medium 23 via optical fibers.

In a modified embodiment, the recording element 20 may also consist of a line of light-emitting diodes, each individual LED being controllable by means of a recording signal $A_n$.

The method is applicable even if the screen dots are recorded on an appropriate radiation-sensitive medium by means of a different source of radiation.

The screen generation may be further improved by storing a greater number than 32×32 (a×b generally) screen threshold values in the read-only memories of the screen generators 37, 38 and 39. The improvement is advantageously accomplished even without a corresponding increase of the storage capacity, if auxiliary values whose quantities are determined in random manner, are superimposed on the unconverted or converted locus co-ordinates of one of the exposure points prior to addressing the read-only memories.

In the embodiment, these randomly selected auxiliary values $x_h$ and $y_h$ are added to the converted current locus co-ordinates $x'_1$ and $y'_1$ of the first exposure point $P_1$ according to the relationship $$\overline{x}'_1 = x'_1 + x_h$$

$$\overline{y}'_1 = y'_1 + y_h$$

Figure 6:
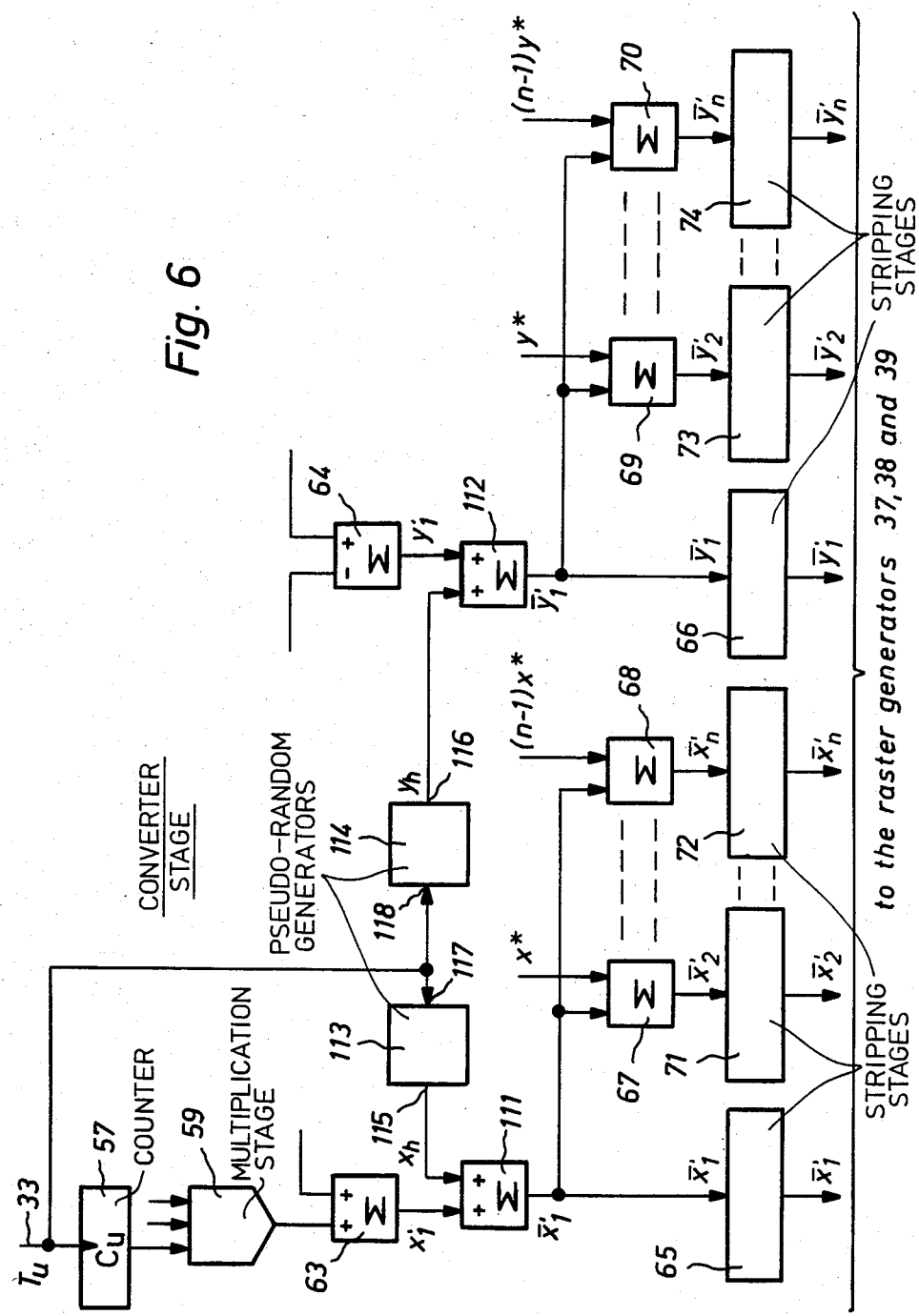
FIG. 6 shows an advantageous development of the converter stage.
Figure 7:
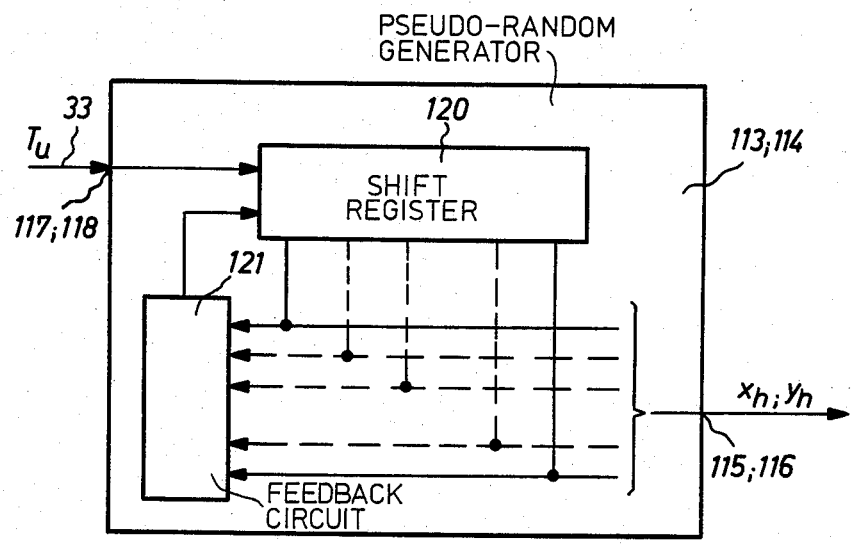
FIG. 7 shows an embodiment for a pseudo-random cadence generator.

FIG. 6 shows a preferred development of the converter stage according to FIG. 3, for application of this technique. To simplify matters, only those functional groups which contribute to an understanding have been taken over from FIG. 3. The adding stages 63 and 64 are followed by complementary adders 111 and 112 wherein the auxiliary values $x_h$ and $y_h$ are added to the converted locus co-ordinates $x'_1$ and $y'_1$ to obtain the new locus co-ordinates $\overline{x}'_1$ and $\overline{y}'_1$. The corresponding locus co-ordinates of the other exposure points are then derived from these locus co-ordinates. Such auxiliary values may also be added to the calculated locus co-ordinates of the individual exposure points. The auxiliary values $x_h$ and $y_h$ are obtained in separate pseudo-random generators 113 and 114 and are fed to the corresponding adding appliances via the output terminals 115 and 116. The input terminals 117 and 118 of the pseudo-random generators 113 and 114 are timed by means of the timing sequence $T_u$ on the conductor 33 (or by the timing sequence $T_v$ on the conductor 35). FIG. 7 shows an embodiment of pseudo-random generator. The measures specified may evidently also be taken in the converter stage according to FIG. 4.

FIG. 7 shows an embodiment for a pseudo-random generator for generating the auxiliary values $x_h$ and $y_h$.

The pseudo-random generator 113;114 substantially comprises an n-bit shift register 120 and a NOR feedback circuit 212. The input terminals 117;118 of the shift register 120 are acted upon by the timing sequences $T_u$ and $T_v$, respectively. Depending on which of the output terminals of the shift register 120 are led back via the feedback circuit 121, a quasi-random sequence of output values which is repeated only within a considerable period, is generated at the output terminals 115;116.

A pseudo-random generator of this kind is described exhaustively in the periodical "Electronics," of May 27th 1976, at page 107.

To improve screen generation, a timing sequence $T'_u$ whose timing intervals are randomly generated, could also be applied instead of a superimposition of auxiliary values.

Figure 8:
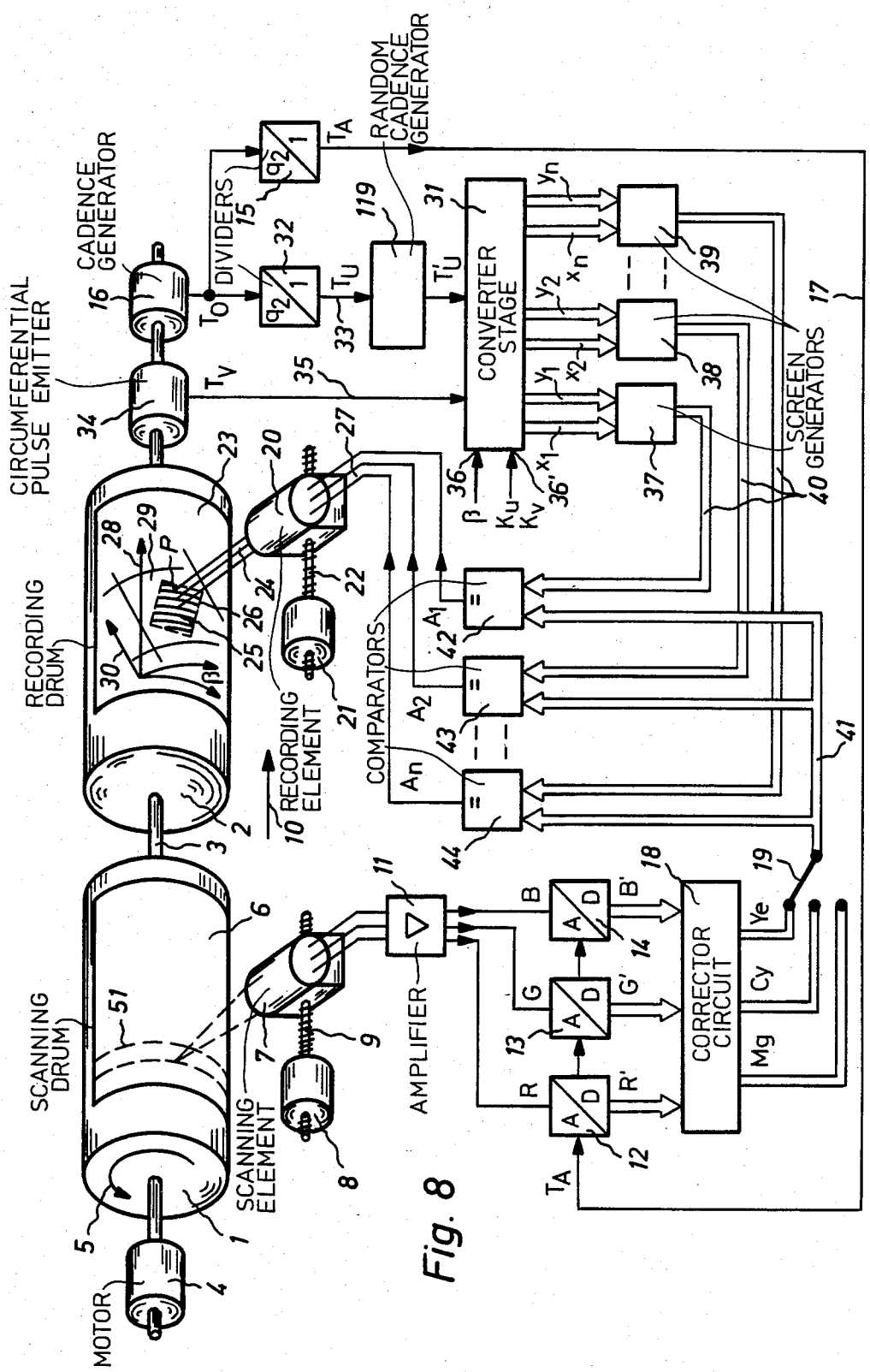
FIG. 8 shows a modified form of a colour scanner.

FIG. 8 shows a modification of the system according to FIG. 1, in which a random cadence generator 119 is situated between the frequency divider 32 and the converter stage 31.

Figure 9:
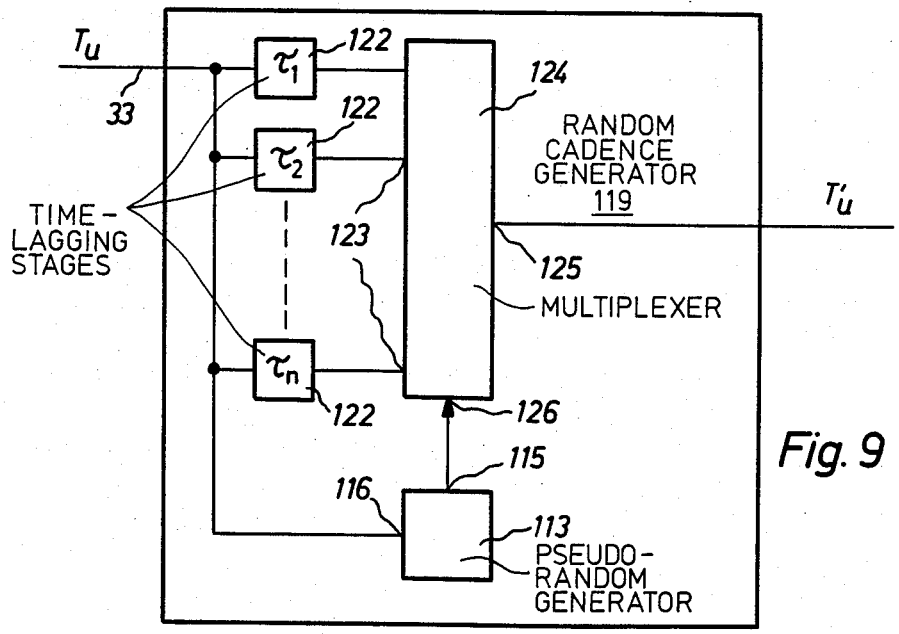
FIG. 9 shows an embodiment of a random cadence generator.

FIG. 9 shows an embodiment for a random cadence generator 119. The timing sequence $T_u$ obtained in the frequency divider 32 is fed to n time-lagging stages 122 with differing delay periods $\tau$.

The time-lagging stages 122 are connected to the input terminals 123 of a multiplexer 124 at whose output terminals 125 the random timing sequence $T'_u$ is delivered. A pseudo-random generator 113 or respectively 114 according to FIG. 7 is connected to the control input terminal 126 of the multiplexer 124.

We claim:

1. A method for producing half-tone reproductions of an original on a recording medium by means of a recording element using rotated screens having any screen angle and any screen line spacing and being formed of periodically repeated, adjacent screen grid elements comprising screen dots varying in size with the tone values of the original, comprising the steps of:
   (a) optoelectronically scanning said original line-by-line and dot-by-dot;
   (b) generating image values from the scanning representing the tone values of the original;
   (c) providing a matrix having a number of matrix elements, said matrix representing said periodically repeated grid elements;
   (d) generating a threshold value for each matrix element, said threshold values representing predetermined grey tone values, and said threshold values having amplitudes and a distribution in the matrix according to a predetermined function;
   (e) subdividing the recording medium into a plurality of adjacent areal elements which are aligned in scanning directions of the recording element and from which the screen dots of the rotated screen are built up inside each screen grid element; and
   (f) during recording medium scanning, generating a recording element recording signal for each areal element to form the screen dots inside the screen grid elements of the rotated screen by comparison of at least one image value with a threshold value of a matrix element whose location within said matrix corresponds to a respective location of said recording medium areal element within said screen grid element of the rotated screen and determining by said comparison of the threshold value and the image value whether the areal element is recorded or not when forming the screen dots.

2. In a method according to claim 1 wherein the step of generating a recording signal is further defined by:
   (a) defining co-ordinate increments ($\Delta u$; $\Delta v$) representing extensions of an areal element in the scanning directions;
   (b) determining constant amounts (Dx; Dy) in accordance with the relationships:

$$Dx = K_u \cdot \Delta u \cos \beta + K_v \cdot \Delta v \cdot \sin \beta$$

$$Dy = -K_u \cdot \Delta u \sin \beta + K_v \cdot \Delta v \cdot \cos \beta$$

wherein $K_u$ and $K_v$ are scaling factors and $\beta$ is said screen angle;
   (c) calculating co-ordinates of each next recording medium areal element (n+1) by adding the constant amounts (Dx; Dy) to the co-ordinates of a preceding areal element (n) in accordance with the equations:

$$x'_{(n+1)} = x'_n + Dx$$

$$y'_{(n+1)} = y'_n + Dy$$

(d) transforming the calculated co-ordinates (x'; y') of momentarily traversed areal elements into addresses (x, y) of the matrix elements within said storage matrix whose locations within the matrix correspond to locations of momentarily traversed areal elements within the screen grid elements of the rotated screen, and
   (e) reading out addressed threshold values from said storage matrix for comparison with corresponding image values.

3. In a method according to claim 1 wherein the areal element of a plurality of recording lines are recorded simultaneously by a plurality of recording elements each controlled by separate recording signals, and wherein said separate recording signals are generated by comparison of said at least one image value with a plurality of threshold values corresponding to said areal elements.

4. In a method according to claim 1 wherein said image values are digitized and stored in a memory.

5. In a method according to claim 4 wherein said stored image values are read out from the memory for said comparison.

6. In a method according to claim 1 wherein the generated threshold values allocated to the matrix elements of said matrix are stored in a storage matrix at locations defined by addresses (x, y).

7. A method according to claim 6 comprising the steps of:
   (a) determining first co-ordinates (u; v) of the recording medium areal elements momentarily traversed by said recording element within a first orthogonal system of co-ordinates (U; V) aligned in the scanning directions of said recording element;

(b) converting the first co-ordinates (u; v) measured in said first system of co-ordinates (U; V) into corresponding second co-ordinates (x'; y') within a second orthogonal system of co-ordinates (X; Y) aligned in the direction of the rotated screen, said second system of co-ordinates defining the locations of said recording medium areal elements within the corresponding screen grid elements of said rotated screen;

(c) transforming the converted second co-ordinates (x'; y') of the recording medium areal elements into the addresses (x; y) of the matrix elements within said storage matrix, locations of said matrix elements within the matrix corresponding to the locations of the momentarily traversed areal elements within the screen grid elements of the rotated screen, and (d) recalling the threshold values from said storage matrix by addressing for comparison with the corresponding image values.

8. In a method according to claim 7 wherein the conversion of the first co-ordinates (u; v) into the second co-ordinates (x'; y') is performed in accordance with the relationships:

$$x' = K_u \cdot u \cdot \cos \beta + K_v \cdot v \cdot \sin \beta$$

$$y' = -K_u \cdot u \cdot \sin \beta + K_v \cdot v \cdot \cos \beta$$

wherein "$\beta$" is the screen angle of the rotated screen and the coefficients "$K_u$" and "$K_v$" are scaling factors.

9. In a method according to claim 7 wherein the step of determining the first co-ordinates (u, v) is further defined by:

(a) defining co-ordinate increments ($\Delta u$; $\Delta v$) representing extensions of an areal element in the scanning directions; and (b) determining said first co-ordinates (u; v) by a continuing summation addition of co-ordinate increments ($\Delta u$; $\Delta v$) in synchronism with a relative movement of said recording element with respect to said recording medium from areal element to areal element.

10. In a method according to claim 7 wherein a plurality of recording elements are provided for simultaneously recording a plurality of areal elements, the step of generating said second co-ordinates of said areal elements simultaneously recorded by said plurality of recording members by adding constant amounts to calculated second co-ordinates of one of said areal elements, said constant amounts representing distances of said areal elements from said one areal element.

11. In a method according to claim 7 wherein said step of transforming the converted second co-ordinates (x'; y') into the addresses (x; y) of said matrix elements within the matrix is performed according to the equations:

$$x = x' \bmod a$$

$$y = y' \bmod b$$

wherein a and b are the number of matrix elements in the directions of said second orthogonal system of co-ordinates (X; Y).

12. In a method according to claim 11 wherein the conversion of the co-ordinates is performed digitally and wherein said step of transforming is performed by omitting bits of higher significance from the second co-ordinates (x'; y').

13. In a method according to claim 7 further comprising the steps of:

(a) providing values in random manner, and (b) superimposing said random values onto said second co-ordinates prior to recalling the addressed threshold values from said storage matrix.

14. In a method according to claim 13 wherein the random values are superimposed on said second co-ordinates additively.

15. In a method according to claim 7 wherein the step of determining the first co-ordinates (u; v) of the areal elements is further defined by:

(a) defining co-ordinate increments ($\Delta u$; $\Delta v$) representing extensions of an areal element in the scanning directions; and (b) determining said first co-ordinates (u; v) by counting said co-ordinate increments ($\Delta u$; $\Delta v$) in synchronism with a relative movement of said recording element with respect to said recording medium from areal element to areal element.

16. In a method according to claim 15 wherein timing pulse sequences are generated from the relative movement of said recording member with respect to said recording medium from areal element to areal element and wherein the pulses of said timing pulse sequences are defining said coordinate increments ($\Delta u$; $\Delta v$).

17. In a method according to claim 16 wherein the pulses of the timing pulse sequences are shifted in random manner.

18. An apparatus for producing half-tone reproductions of an original on a recording medium by means of a recording element using rotated screens having any screen angle and any screen line spacing and being formed of periodically repeated, adjacent screen grid elements comprising screen dots varying in size with the tone values of the original, comprising:

(a) means for optoelectronically scanning said original line-by-line and dot-by-dot;

(b) means for generating image values from the scanning representing the tone values of the original;

(c) means for providing a matrix having a number of matrix elements, said matrix representing said periodically repeated grid elements;

(d) means for generating a threshold value for each matrix element, said threshold values representing predetermined grey tone values, and said threshold values having amplitudes and a distribution in the matrix according to a predetermined function;

(e) means for subdividing the recording medium into a plurality of adjacent areal elements which are aligned in scanning directions of the recording element and from which the screen dots of the rotated screen are built up inside each screen grid element; and (f) means for generating during recording medium scanning a recording element recording signal for each areal element to form the screen dots inside the screen grid elements of the rotated screen by comparison of at least one image value with a threshold value of a matrix element whose location within said matrix corresponds to a respective location of said recording medium areal element within said screen grid element of the rotated screen and determining by said comparison of the threshold value and the image value whether the areal element is recorded or not when forming the screen dots.

19. In an apparatus according to claim 18 for generating a recording signal the apparatus further comprises:
(a) means for defining co-ordinate increments ($\Delta u$; $\Delta v$) representing extensions of an areal element in the scanning directions;
(b) means for determining constant amounts (Dx; Dy) in accordance with the relationships:

$$Dx = K_u \cdot \Delta u \cos \beta + K_v \cdot \Delta v \cdot \sin \beta$$

$$Dy = -K_u \cdot \Delta u \sin \beta + K_v \cdot \Delta v \cdot \cos \beta$$

wherein $K_u$ and $K_v$ are scaling factors and $\beta$ is said screen angle;
(c) means for calculating co-ordinates of each next recording medium areal element (n+1) by adding the constant amounts (Dx; Dy) to the co-ordinates of a preceding areal element (n) in accordance with the equations:

$$x'_{(n+1)} = x'_n + Dx$$

$$y'_{(n+1)} = y'_n + Dy$$

(d) means for transforming the calculated co-ordinates (x'; y') of momentarily traversed areal elements into addresses (x, y) of the matrix elements within said storage matrix whose locations within the matrix correspond to locations of momentarily traversed areal elements within the screen grid elements of the rotated screen, and
(e) means for reading out addressed threshold values from said storage matrix for comparison with corresponding image values.

20. In an apparatus according to claim 18 further including means for recording the areal elements of a plurality of recording lines simultaneously by a plurality of recording elements each controlled by separate recording signals, and means for generating said separate recording signals by comparison of said at least one image value with a plurality of threshold values corresponding to said areal elements.

21. In an apparatus according to claim 18 wherein means are provided for digitizing and storing in a memory said image values.

22. In an apparatus according to claim 21 including means for reading out said stored image values from the memory for said comparison.

23. In an apparatus according to claim 18 including means for storing the generated threshold values allocated to the matrix elements of said matrix in a storage matrix at locations defined by addresses (x, y).

24. An apparatus according to claim 23 further including:
(a) means for determining first co-ordinates (u; v) of the recording medium areal elements momentarily traversed by said recording element within a first orthogonal system of co-ordinates (U; V) aligned in the scanning directions of said recording element;
(b) means for converting the first co-ordinates (u; v) measured in said first system of co-ordinates (U; V) into corresponding second co-ordinates (x'; y') within a second orthogonal system of co-ordinates (X; Y) aligned in the direction of the rotated screen, said second system of co-ordinates defining the locations of said recording medium areal elements within the corresponding screen grid elements of said rotated screen;
(c) means for transforming the converted second co-ordinates (x'; y') of the recording medium areal elements into the addresses (x; y) of the matrix elements within said storage matrix, locations of said matrix elements within the matrix corresponding to the locations of the momentarily traversed areal elements within the screen grid elements of the rotated screen, and
(d) means for recalling the threshold values from said storage matrix by addressing for comparison with the corresponding image values.

25. In an apparatus according to claim 24 including means for performing the conversion of the first co-ordinates (u; v) into the second co-ordinates (x'; y') in accordance with the relationships:

$$x' = K_u \cdot u \cdot \cos \beta + K_v \cdot v \cdot \sin \beta$$

$$y' = -K_u \cdot u \cdot \sin \beta + K_v \cdot v \cdot \cos \beta$$

wherein "$\beta$" is the screen angle of the rotated screen and the coefficients "$K_u$" and "$K_v$" are scaling factors.

26. In an apparatus according to claim 24 wherein for determining the first co-ordinates (u, v) the apparatus further comprises:
(a) means for defining co-ordinate increments ($\Delta u$; $\Delta v$) representing extensions of an areal element in the scanning directions; and
(b) means for determining said first co-ordinates (u; v) by a continuing summating addition of co-ordinate increments ($\Delta u$; $\Delta v$) in synchronism with a relative movement of said recording element with respect to said recording medium from areal element to areal element.

27. In an apparatus according to claim 24 including means for performing said step of transforming the converted second co-ordinates (x'; y') into the addresses (x; y) of said matrix elements within the matrix according to the equations:

$$x = x' \bmod a$$

$$y = y' \bmod b$$

wherein a and b are the number of matrix elements in the directions of said second orthogonal system of co-ordinates (X; Y).

28. In an apparatus according to claim 27 including means for performing the conversion of the co-ordinates digitally and means for performing said step of transforming by omitting bits of higher significance from the second co-ordinates (x'; y').

29. In an apparatus according to claim 24 wherein for determining the first co-ordinates (u; v) of the areal elements the apparatus further comprises:
(a) means for defining co-ordinate increments ($\Delta u$; $\Delta v$) representing extensions of an areal element in the scanning directions; and
(b) means for determining said first co-ordinates (u; v) by counting said co-ordinate increments ($\Delta u$; $\Delta v$) in synchronism with a relative movement of said recording element with respect to said recording medium from areal element to areal element.

30. In an apparatus according to claim 29 including means for generating timing pulse sequences from the relative movement of said recording member with respect to said recording medium from areal element to areal element and wherein the pulses of said timing pulse sequences are defining said co-ordinate increments ($\Delta u$; $\Delta v$).

31. In an apparatus according to claim 30 further including means for shifting the pulses of the timing pulse sequences in random manner.

32. In an apparatus according to claim 24 further including:
   (a) means for providing values in random manner, and
   (b) means for superimposing said random values onto said second co-ordinates prior to recalling the addressed threshold values from said storage matrix.

33. In an apparatus according to claim 32 further including means for superimposing the random values on said second co-ordinates additively.

34. In an apparatus according to claim 24 comprising: a plurality of recording element means for simultaneously recording a plurality of areal elements and means for generating said second co-ordinates of said areal elements simultaneously recorded by said plurality of recording members by adding constant amounts to calculated second co-ordinates of one of said areal elements, said constant amounts representing distances of said areal elements from said one areal element.

35. The methods of producing a screened color separation having any screen angle ($\beta$) comprising the steps of:
   (a) scanning a color original pixel by pixel and line by line to produce a set of picture values, the adjacent scan lines having a selected step between them,
   (b) digitizing and storing said picture values,
   (c) scanning and exposing a reproduction member resolution element by resolution element and line by line in response to exposure signals, the adjacent exposure scan lines having a selected step between them,
   (d) generating screen values representing the grey-tone values in a complete period in the orthogonal directions (a and b) of a periodic half-tone screen, said screen period being in the form of a grid defined by orthogonal a and b rulings, the different screen values being assigned to different locations in the grid,
   (e) storing the screen values in a memory matrix at locations having memory addresses corresponding to the locations of the screen values in the grid,
   (f) recalling the screen values from the memory matrix by
      (1) computing the memory address components corresponding to each memory location in accordance with the following equations:

$$x_{(n+1)} = [x_n + (K_u \cdot \Delta u \cdot \cos \beta + K_v \cdot \Delta v \cdot \sin \beta)] \bmod a$$

$$y_{(n+1)} = [y_n + (K_u \cdot \Delta u \cdot \sin \beta + K_v \cdot \Delta v \cdot \cos \beta)] \bmod b$$

wherein:
   when moving along one type line v is constant so that $\Delta v = 0$,
   when going from one type line to the next u is constant so that $\Delta u = 0$,
   x and y are the memory address components, and $K_u \cdot \Delta u$ and $K_v \cdot \Delta v$ are scaling factors,
   mod a and mod b signify the address calculations using modulo a and b arithmetic, and
      (2) rounding off each computed memory address component to a whole number corresponding to an actual memory address before addressing the memory matrix,
   (g) recalling the picture values in the order in which the picture was scanned, and
   (h) comparing the recalled screen values with the recalled picture values to produce said exposure signals for exposing the reproduction member.

36. The method defined in claim 35 and including the additional step of adding a random number to each computed memory address component prior to said rounding-off step.

37. The apparatus for producing a screened color separation having any screen angle ($\beta$) comprising:
   (a) means for scanning a color original pixel by pixel and line by line to produce a set of picture values, the adjacent scan lines having a selected step between them,
   (b) means for digitizing and storing said picture values,
   (c) means for scanning and exposing a reproduction member resolution element by resolution element and line by line in response to exposure signals, the adjacent exposure scan lines having a selected step between them,
   (d) means for generating screen values representing the grey-tone values in a complete period in the orthogonal directions (a and b) of a periodic half-tone screen, said screen period being in the form of a grid defined by orthogonal a and b rulings, the different screen values being assigned to different locations in the grid,
   (e) means for storing the screen values in a memory matrix at locations having memory addresses corresponding to the locations of the screen values in the grid,
   (f) means for recalling the screen values from the memory matrix, said means including
      (1) means for computing the memory address components corresponding to each memory location in accordance with the following equations:

$$x_{(n+1)} = [x_n + (K_u \cdot \Delta u \cdot \cos \beta + K_v \cdot \Delta v \cdot \sin \beta)] \bmod a$$

$$y_{(n+1)} = [y_n + (-K_u \cdot \Delta u \cdot \sin \beta + K_v \cdot \Delta v \cdot \cos \beta)] \bmod b$$

wherein:
   when moving along one type line v is constant so that $\Delta v = 0$,
   when going from one type line to the next u is constant so that $\Delta u = 0$,
   x and y are the memory address components, and $K_u \cdot \Delta u$ and $K_v \cdot \Delta v$ are scaling factors,
   mod a and mod b signify the address calculations using modulo a and b arithmetic, and
      (2) means for rounding off each computed memory address component to a whole number corresponding to an actual memory address before addressing the memory matrix,
   (g) means for recalling the picture values in the order in which the picture was scanned, and
   (h) means for comparing the recalled screen values with the recalled picture values to produce said exposure signals for exposing the reproduction member.

38. The apparatus defined in claim 37 and further including the means for adding a random number to each computed memory address component prior to said rounding-off step.

39. The method of producing a screened color separation having any screen angle ($\beta$) comprising the steps of:
    (a) scanning a color original pixel by pixel and line by line to produce a set of picture values, the adjacent scan lines having a selected step between them,
    (b) digitizing and storing said picture values,
    (c) scanning and exposing a reproduction member resolution element by resolution element and line by line in response to exposure signals, the adjacent exposure scan lines having a selected step between them,
    (d) generating screen values representing the grey-tone values in a complete period in the orthogonal directions (a and b) of a periodic half-tone screen, said screen period being in the form of a grid defined by orthognal a and b rulings, the different screen values being assigned to different locations in the grid,
    (e) storing the screen values in a memory matrix at locations having memory addresses corresponding to the locations of the screen values in the grid,
    (f) recalling the screen values from the memory matrix by
        (1) computing the memory address components corresponding to each memory location in accordance with the following equations:

$$x_{(n+1)} = [x_n + (K_u \cdot \Delta u \cdot \cos \beta + K_v \cdot \Delta v \cdot \sin \beta)] \bmod a$$

$$y_{(n+1)} = [y_n + (-K_u \cdot \Delta u \cdot \sin \beta + k_v \cdot \Delta v \cdot \sin \beta)] \bmod b$$

wherein:
    when moving along one type line v is constant so that $\Delta v = 0$,
    when going from one type line to the next u is constant so that $\Delta u = 0$,
    x and y are the memory address components, and $K_u \cdot \Delta u$ and $K_v \cdot \Delta v$ are scaling factors,
    mod a and mod b signify the address calculations using modulo a and b arithmetic,
    (g) recalling the picture values in the order in which the picture was scanned, and
    (h) comparing the recalled screen values with the recalled picture values to produce said exposure signals for exposing the reproduction member.

40. The method of producing a screened color separation having any screen angle ($\beta$) comprising the steps of:
    (a) producing a set of picture values representative of a color original which is scanned pixel by pixel and line by line in a raster format;
    (b) generating a set of screen values representing the grey-tone values of a complete period in two dimensions of a half-tone screen which
        (1) is periodic in said two dimensions, and
        (2) is oriented at a reference angle,
    (c) storing the screen values in a memory at locations therein having memory addresses corresponding to their locations in the screen;
    (d) scanning and exposing a reproduction member resolution element by resolution element and line by line in response to exposure signals;
    (e) generating a succession of said screen value memory addresses;
    (f) processing each said generated address with a rotated coordinate system mathematical transformation to develop a succession of transformed memory addresses corresponding substantially to said locations in said screen when oriented at a selected angle relative to said reference angle;
    (g) addressing the memory using the transformed memory addresses to recall screen values from the memory; and
    (h) comparing the picture values with the recalled screen values to produce said exposure signals for exposing the reproduction member.

41. The method of producing a screened color separation having any screen angle ($\beta$) comprising the steps of:
    (a) scanning a color original pixel by pixel and line by line to produce a set of picture values, the adjacent scan lines having a selected step between them,
    (b) digitizing and storing said picture values,
    (c) scanning and exposing a reproduction member resolution element by resolution element and line by line in response to exposure signals, the adjacent exposure scan lines having a selected step between them,
    (d) generating screen values representing the grey-tone values in a complete period in the orthogonal directions (a and b) of a periodic half-tone screen, said screen period being in the form of a grid defined by orthogonal a and b rulings, the different screen values being assigned to different locations in the grid,
    (e) storing the screen values in a memory matrix at locations having memory addresses corresponding to the locations of the screen values in the grid,
    (f) recalling the screen values from the memory matrix
        (1) computing the memory address components corresponding to each memory location in accordance with the following equations:

$$x_{(n+1)} = [x_n + (K_u \cdot \Delta u \cdot \cos \beta + K_v \cdot \Delta v \cdot \sin \beta)] \bmod a$$

$$y_{(n+1)} = [y_n + (K_u \cdot \Delta u \cdot \sin \beta + K_v \cdot \Delta v \cdot \cos \beta)] \bmod b$$

wherein:
    when moving along one type line v is constant so that $\Delta v = 0$,
    when going from one type line to the next u is constant so that $\Delta u = 0$,
    x and y are the memory address components, and $K_u \cdot \Delta u$ and $K_v \cdot \Delta v$ are scaling factors,
    mod a and mod b signify the address calculations using modulo a and b arithmetic, and
        (2) limiting each computed memory address component to a whole number corresponding to an actual memory address before addressing the memory matrix,
    (g) recalling the picture values in the order in which the picture was scanned, and
    (h) comparing the recalled screen values with the recalled picture values to produce said exposure signals for exposing the reproduction member.

42. The apparatus for producing a screened color separation having any screen anble ($\beta$) comprising:
    (a) means for scanning a color original pixel by pixel and line by line to produce a set of picture values, the adjacent scan lines having a selected step between them, (b) means for digitizing and storing said picture values, (c) means for scanning and exposing a reproduction member resolution element by resolution element and line by line in response to exposure signals, the adjacent exposure scan lines having a selected step between them, (d) means for generating screen values representing the grey-tone values in a complete period in the orthogonal directions (a and b) of a periodic half-tone screen, said screen period being in the form of a grid defined by orthogonal a and b rulings, the different screen values being assigned to different locations in the grid, (e) means for storing the screen values in a memory matrix at locations having memory addresses corresponding to the locations of the screen values in the grid, (f) means for recalling the screen values from the memory matrix, said means including
  (1) means for computing the memory address components corresponding to each memory location in accordance with the following equations:

$$x_{(n+1)} = [x_n + K_u \cdot \Delta u \cdot \cos \beta + K_v \cdot \Delta v \cdot \sin \beta)] \bmod a$$

$$y_{(n+1)} = [y_n + (-K_u \cdot \Delta u \cdot \sin \beta + K_v \cdot \Delta v \cdot \cos \beta)] \bmod b$$

wherein:
when moving along one type line v is constant so that $\Delta v = 0$,
  when going from one type line to the next u is constant so that $\Delta u = 0$,
  x and y are the memory address components, and $K_u \cdot \Delta u$ and $K_v \cdot \Delta v$ are scaling factors,
  mod a and mod b signify the address calculations using modulo a and b arithmetic, and
  (2) means for limiting each computed memory address component to a whole number corresponding to an actual memory address before addressing the memory matrix, (g) means for recalling the picture values in the order in which the picture was scanned, and (h) means for comparing the recalled screen values with the recalled picture values to produce said exposure signals for exposing the reproduction member.

43. The method of producing a screened color separation having any screen angle ($\beta$) comprising the steps of:

(a) producing a set of picture values representative of a color original which is scanned pixel by pixel and line by line in a raster format;

(b) generating a set of screen values representing the grey-tone values of a period in two dimensions of a half-tone screen which
  (1) is periodic in said two dimensions,
  (2) is oriented at a reference angle, and
  (3) has a finer mesh than the scanning raster;

(c) storing the screen values in a memory at locations therein having memory addresses corresponding to their locations in the screen;

(d) scanning and exposing a reproduction member resolution element by resolution element and line by line in response to exposure signals;

(e) generating a succession of said screen value memory addresses;

(f) processing each said generated address with a rotated coordinate system mathematical transformation to develop a succession of transformed memory addresses corresponding substantially to said locations in said screen when oriented at a selected angle relative to said reference angle;

(g) addressing the memory using the transformed memory addresses to recall screen values from the memory; and (h) comparing the picture values with the recalled screen values to produce said exposure signals for exposing the reproduction member.

44. Apparatus for producing a screened color separation having any screen angle ($\beta$) comprising:

(a) means for producing a set of picture values representative of a color original which is scanned pixel by pixel and line by line in a raster format;

(b) means for generating a set of screen values representing the grey-tone vlaues of a period in two dimensions of a half-tone screen which
  (1) is periodic in said two dimensions,
  (2) is oriented at a reference angle; and
  (3) has a finer mesh than the scanning raster;

(c) means for storing the screen values in a memory at locations therein having memory addresses corresponding to their locations in the screen;

(d) means for scanning and exposing a reproduction member resolution element by resolution element and line by line in response to exposure signals;

(e) means for generating a succession of said screen value memory addresses;

(f) means for processing each said generated address with a rotated coordinate system mathematical transformation to develop a succession of transformed memory addresses corresponding substantially to said locations in said screen when oriented at a selected angle relative to said reference angle;

(g) means for addressing the memory using the transformed memory addresses to recall screen values from the memory; and (h) means for comparing the picture values with the recalled screen values to produce said exposure signals for exposing the reproduction member.

45. The method of producing a screened color reproduction having any selected screen angle comprising the steps of:

A. deriving a set of picture values representative of a raster-scanned color original, B. generating a screen function representing a period of a half-tone screen in the form of a grid-like array of grey-tone values, said array being oriented at a reference angle, C. storing said grey-tone values in a memory at addressable memory locations, D. scanning and exposing a reproduction member in a raster format in response to exposure signals, E. generating a succession of said grey-tone value memory addresses, F. processing each said generated address with a rotated coordinate system transformation to develop a succession of transformed memory addresses, G. rounding off each said transformed memory address to the actual memory address, H. addressing the memory using the rounded-off memory addresses to recall said grey-tone values from memory, and I. comparing the picture values and the recalled grey-tone values to produce said exposure signals for exposing the reproduction member.

46. The method defined in claim 45 and including the additional step of adding random numbers to said transformed memory address prior to comparing the picture values and the recalled grey-tone values.

47. The method defined in claim 45 wherein the screen function is generated so as to give said array a selected mesh which is finer than the scanning raster.

48. Apparatus for producing a screened color reproduction having any selected screen angle comprising
   A. means for deriving a set of picture values representative of a raster-scanned color original,
   B. means for generating a screen function representing a period of a half-tone screen in the form of a grid-like array of grey-tone values, said array being oriented at a reference angle,
   C. means for storing said grey-tone values in a memory at addressable memory locations,
   D. means for scanning and exposing a reproduction member in a raster format in response to exposure signals,
   E. means for generating a succession of said grey-tone value memory addresses,
   F. means for processing each said generated address with a rotated coordinate system transformation to develop a succession of transformed memory addresses,
   G. means for rounding off each said transformed memory address to the actual memory address,
   H. means for addressing the memory using the rounded-off memory addresses to recall said grey-tone values from memory, and
   I. means for comparing the picture values and the recalled grey-tone values to produce said exposure signals for exposing the reproduction member.

49. The apparatus defined in claim 48 and further including means for adding random numbers to said transformed memory addresses prior to comparing the picture values and the recalled grey-tone values.

50. The apparatus defined in claim 48 wherein the generating means generates said array with a mesh that is finer than the scanning raster.

* * * * *